No. 759,018. PATENTED MAY 3, 1904.
A. ROWAN.
HAY LOADER AND RAKER.
APPLICATION FILED AUG. 27, 1903.
NO MODEL. 3 SHEETS—SHEET 1.
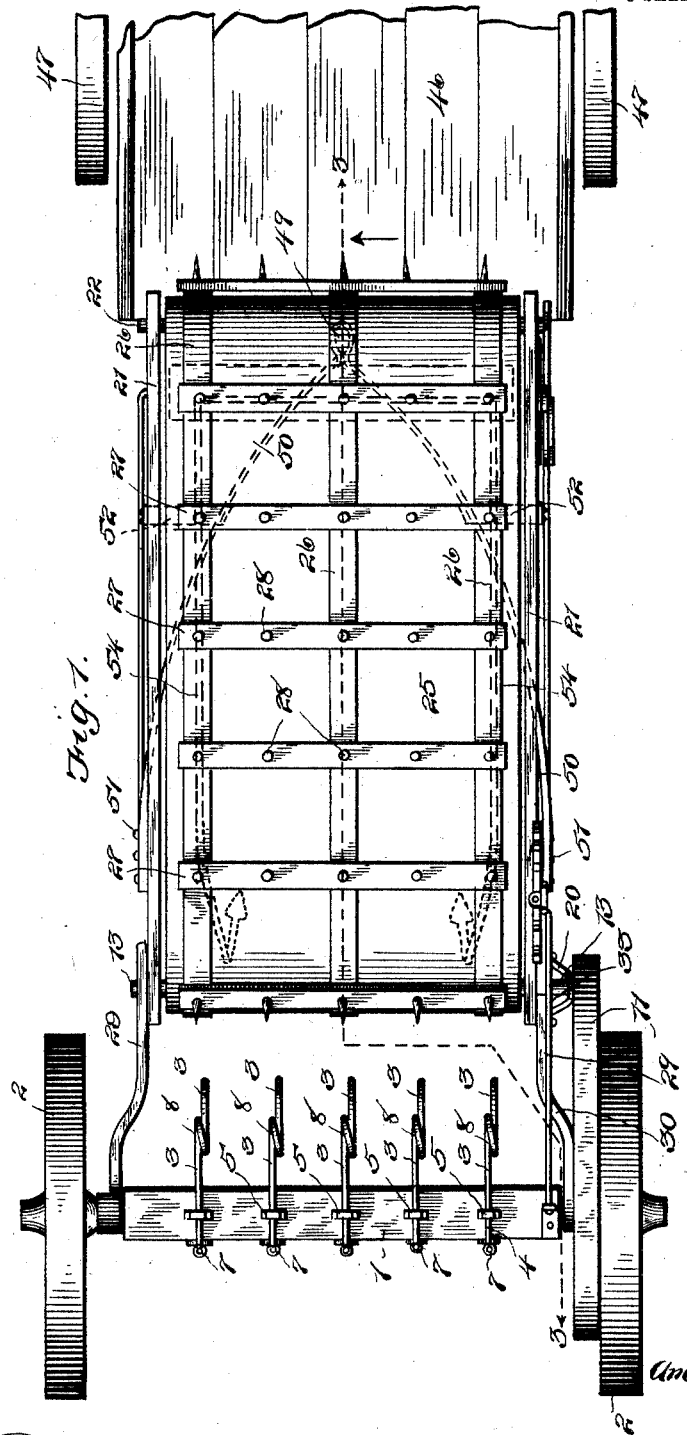
Witnesses
R. A. Boswell.
E. M. Brandt.
Inventor
Andy Rowan.
By E. H. Bond, Attorney

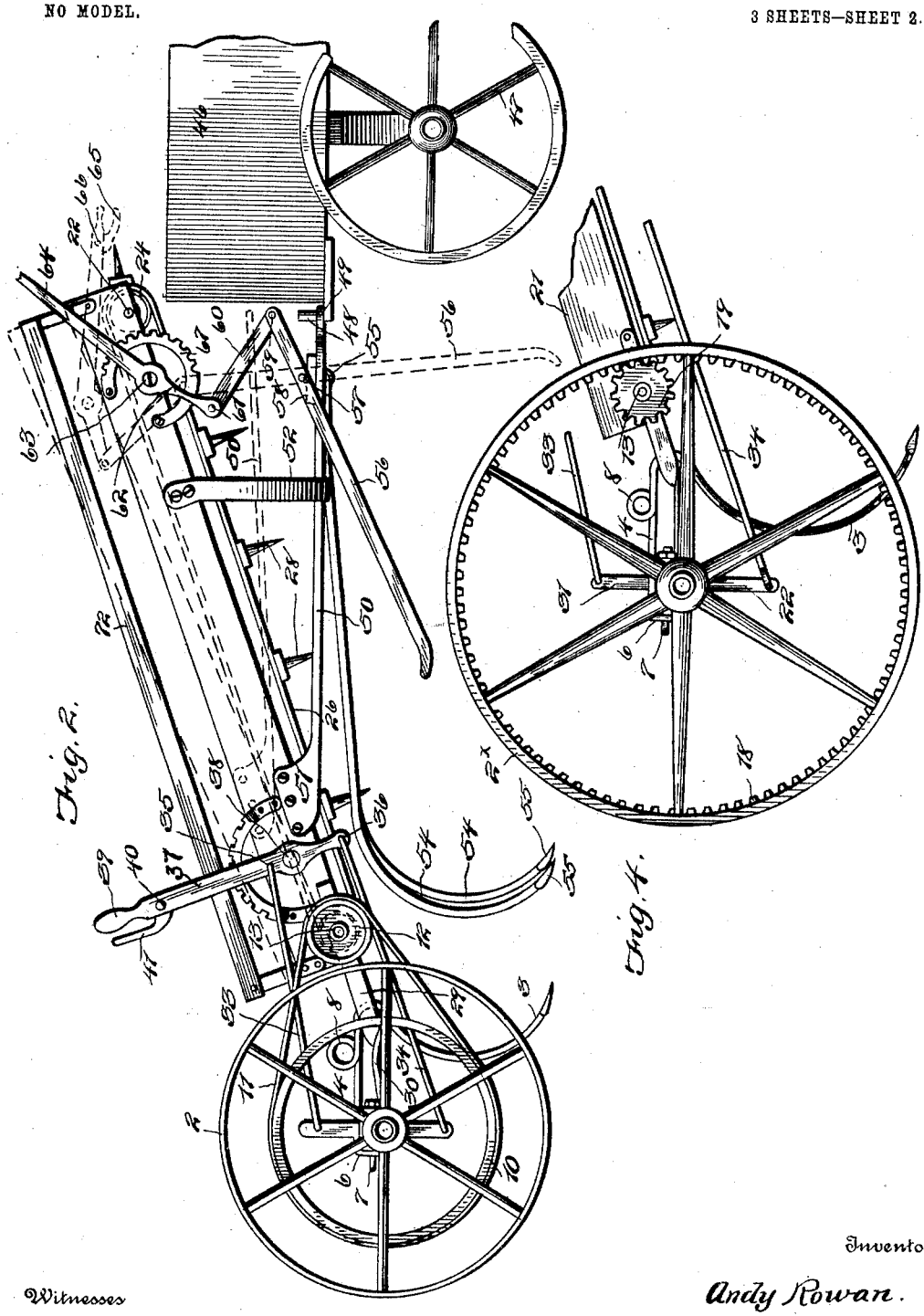

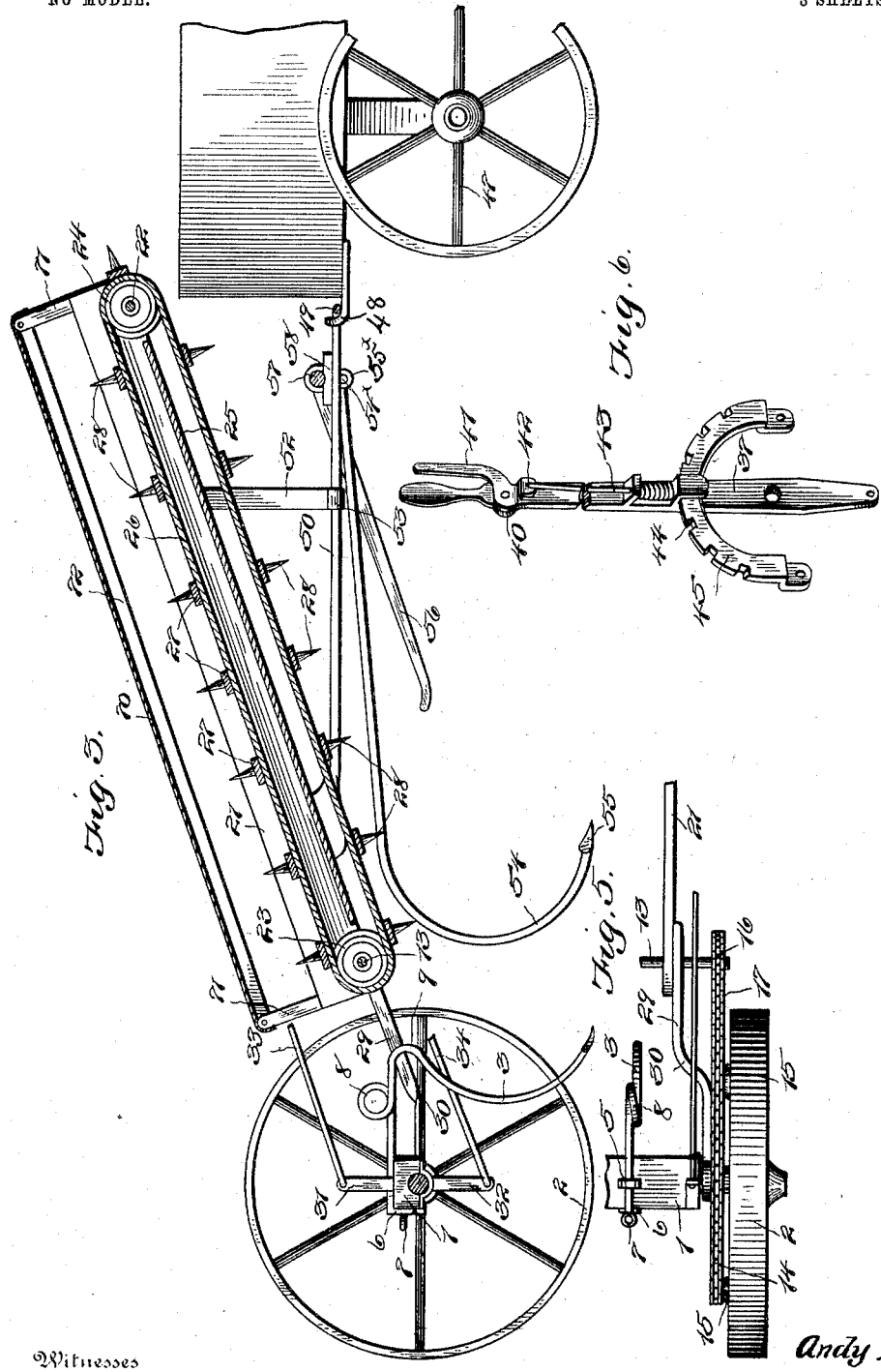

No. 759,018.                                              Patented May 3, 1904.

UNITED STATES PATENT OFFICE.

ANDY ROWAN, OF STEAMBOAT SPRINGS, COLORADO.

HAY LOADER AND RAKER.

SPECIFICATION forming part of Letters Patent No. 759,018, dated May 3, 1904.

Application filed August 27, 1903. Serial No. 170,924. (No model.)

*To all whom it may concern:*

Be it known that I, ANDY ROWAN, a citizen of the United States of America, and a resident of Steamboat Springs, in the county of Routt and State of Colorado, have invented certain new and useful Improvements in Hay Loaders and Rakers, of which the following is a specification.

This invention relates to certain new and useful improvements in hay loaders and rakers; and it has for its objects, among others, to provide an improved device of this character which shall be compact in its arrangement of parts, simple in its construction, easy to manipulate, and reliable in its operation.

I provide a novel form of machine for the purpose of raking and loading hay which does not windrow the hay and which saves the same from spoiling in case of rain. It will rake and load the hay right after the mower, and in case of rain the machine is stopped, and when the sun again shines the hay soon dries, which it would not do if it were raked or left in bulk. In case the hay should be a little damp my machine, raking and elevating it on the wagon, agitates the hay so much as to dry it. By my machine labor is saved, and the one machine is made to do the work of several men.

I may employ any convenient form of gearing between the wheels and the elevator mechanism, three only of which are herein illustrated. I provide drag teeth or hooks for separating the hay and throwing it within the reach of the rake-teeth, so that the hay will be raked clean.

Other objects and advantages of the invention will hereinafter appear, and the novel features thereof will be particularly pointed out in the appended claims.

The invention is clearly illustrated in the accompanying drawings, which, with the numerals of reference marked thereon, form a part of this specification, and in which—

Figure 1 is a top plan of my improvement shown in operative position with relation to the wagon. Fig. 2 is a side elevation of the same. Fig. 3 is a vertical longitudinal section on the line 3 3 of Fig. 1 looking in the direction of the arrow. Fig. 4 is an enlarged detail showing a modified form of gearing. Fig. 5 is a detail in top plan, showing still another form of gearing. Fig. 6 is a perspective detail of the operating-lever for the rake detached.

Like numerals of reference indicate like parts throughout the several views.

Referring now to the details of the drawings, 1 designates the axle, and 2 the traction-wheels, which may be of any well-known or approved form of construction, to which, however, no claim is made herein.

3 designates rake-teeth, which have their shanks 4 passed through suitable keepers, as the staples or the like 5, held in the upper face of the axle, and their extreme rear ends bent downward, as at 6, and secured to the axle upon the rear face thereof by means of eyebolts or analogous means 7. At a point forward of their attachment to the upper face of the axle each rake-tooth is formed with a coil 8, extending above the general plane of the shank, as seen in Figs. 2 and 3, and then extended forward and bent, as at 9, the lower portion of the tooth being curved to the front, the portion intermediate said bend 9 and the point being to the rear of a vertical line drawn through said bend, as illustrated most clearly in Fig. 3.

While the elevator-belt or other means may be operated from both of the driving-wheels 2, in which case a suitable clutch mechanism should be provided to be thrown out of gear when turning corners, &c., I prefer to drive the said elevator from one wheel only. This may be done by different means. For instance, in Figs. 1 and 2 I have shown the wheel as provided with the rim or pulley 10, around which passes a belt 11, which passes around a band-pulley 12 on the rear axle 13 of the elevator, whereby motion is imparted to the elevator-belt by the rotation of the traction-wheel 2. In Fig. 5 I have shown the wheel 2 as provided with a sprocket-wheel 14, secured upon the inner face thereof by suitable supports 15, and the rear elevator-shaft 13 is provided with a sprocket-wheel 16, around which sprocket-wheels 14 and 16 passes a sprocket-chain 17, the result being the same in the constructions shown in Figs. 1 and 2. In Fig. 4 I have shown the wheel $2^x$ as provided upon its inner periphery with a geared rim 18, with which meshes a gear 19 on the lower shaft 13 of the elevator, the result being that the elevator-belt is operated by the rotation of the traction-wheel.

The shaft 13 may be suitably braced, as by braces 20, where it extends beyond the elevator-frame, as seen clearly in Fig. 1.

The elevator comprises a frame consisting of the side pieces 21, in which is mounted the rear elevator-shaft 13 and the forward shaft 22. The shafts 13 and 22 are provided with rollers 23 and 24, over which passes the elevator-belt. These rollers extend partially above and partially below the bottom board 25 of the elevator, as seen clearly in Figs. 2 and 3, so that the belt moves above and below said bottom board in a manner well known in this art.

The elevator-belt may be of any well-known or approved form of construction. In Fig. 1 it is shown as composed of a series of bands 26, connected by the cross-slats 27, which are provided with suitable teeth or projections 28, secured in said slats in any well-known manner. These bands pass over the rollers 23 and 24, and the belt is operated, as hereinbefore described, by means of the gearing or other connection between the lowermost shaft 13 and the traction-wheels 2.

29 designates arms sleeved upon the spindles at the ends of the axle, being offset, as at 30, (see Figs. 1 and 5,) and the other ends of these arms are connected with the side bars of the elevator-frame, as seen in Figs. 1 and 2, whereby the elevator-frame is adapted to be tilted into any inclination desired.

31 is an arm extending upwardly from the axle 1, as seen in Fig. 3, and 32 is an arm depending therefrom.

33 is a rod pivotally connected with the upper end of the arm 31, while 34 is a rod pivotally connected with the lower end of the arm 32. These rods 33 and 34 are pivotally connected at 35 and 36, respectively, with a lever 37, said connections being upon opposite sides of the pivot 38 of said lever, as seen in Fig. 2. The lever is provided with a suitable handle 39, and upon said lever is pivoted at 40 an elbow-lever 41, to the short arm of which is pivotally attached, as at 42, a rod 43, carrying a spring-actuated pawl adapted to engage in the notches 44 of a segment 45, suitably secured in position to the side of the elevator-frame, as seen clearly in Fig. 2. By this means the lever 37 may be actuated to tilt the axle to vary the position of the rake-teeth 3 and there lock it by means of the pawl and notched segment in a manner which will be readily understood.

The attachment is designed to be applied to the rear end of a wagon of known construction, a portion of which is seen in Figs. 1, 2, and 3, in which 46 is a portion of the wagon box or body, 47 the wheels of known construction, and to the under side of the rear of said wagon-box or any other portion of the vehicle there is attached a projection or hook or the like 48, as seen in Figs. 2 and 3, which may be of any desired form and over which is adapted to engage the eye or loop 49, formed at the forward end of the yoke or arms 50, the rear ends of which are spread, as seen best in Fig. 1, and secured, as at 51, to the outer sides of the elevator-frame, the construction and arrangement being such that the attachment may be readily applied to or removed from the wagon or other vehicle, with the elevator in such inclined position as to deliver the hay which is fed thereto by the rake into the wagon-body, which will be readily understood from Figs. 1, 2, and 3. The bars 50 are braced intermediate their ends by the brace-arms 52, which are secured rigidly to the outer faces of the side arms of the elevator-frame, as seen best in Fig. 2, and formed with eyes 53 or analogous means for receiving and holding the bars 50 in a manner which will be evident from Fig. 3.

54 designates supplemental teeth disposed in advance of the rake-teeth 3, as seen clearly in Figs. 2 and 3 and as seen by dotted lines in Fig. 1, extended upon opposite sides of the machine, with their points 55 inclined inward and toward the center of the machine so as to bring the hay into the path of the rake-teeth 3, so that all in the line of movement of the machine will be gathered up by said teeth and into position where it will be taken up by the teeth of the slats of the elevator.

In order that the attachment may be easily removed from its connection with the wagon-body 46 of the vehicle to which it is attached and supported in its elevated position while another wagon is placed in position, I provide the feet or standards 56, as seen in Figs. 2 and 3. There is one of these near each side of the machine, each being pivotally mounted, as at 57, to some suitable part, as the rods 50 or a cross-bar 58, connecting the same as seen in Figs. 2 and 3. The upper ends extend beyond their pivots, and to said upper ends there are pivotally connected, as at 59, one end of the rods 60, the other ends of which are pivotally connected, as at 61, to one arm of a lever 62, pivotally mounted, as at 63, on one of the sides of the machine and its handle portion 64, carrying a lever 65, pivoted at 66 on said lever and carrying a spring-pawl of ordinary construction adapted to engage a curved rack 67. When the attachment is in position, as seen in Figs. 2 and 3, these feet 56 and their connecting-bars and operating-lever are in the position seen in full lines in Fig. 2. When the hay-rack is loaded and it is desired to disconnect the attachment, the lever 62 is forced down into the position in which it is seen in dotted lines in said Fig. 2, and this brings the feet and other parts into the position in which they are seen in dotted lines in said Fig. 2. This raises the rods 50 so as to disengage their loop portion 49 from the hook or projection 48, raising the attachment entirely free of the wagon and bringing the legs 56 into such position as to support the attachment in its elevated position until ready to attach to another wagon, when by raising the lever 62 the legs 56 are bent backward into the position seen in full lines in Fig. 2, and the attachment is lowered so as to bring it into such position as to allow it to be attached to the wagon-body.

It will be noted that the supplemental teeth 54 are carried by a cross portion 54$^\times$, which is pivotally mounted in eyes or the like 55$^\times$ on the under side of the bar 58, which connects the rods 50.

70 in Fig. 3 represents a cover, of canvas, rubber, or analogous material, stretched over the top of the elevator, being supported on suitable means, as the standards 71 and the frame or the like 72 connected therewith, as seen in Figs. 2 and 3, so as to be used in case of a wind to prevent the wind from scattering the hay. These standards and framework with the cover may be detachably supported in position, so as to be removed when not needed.

The operation will be apparent from the foregoing description when taken in connection with the annexed drawings, and a further detailed description thereof is not deemed necessary.

Modifications in detail may be resorted to without departing from the spirit of the invention or sacrificing any of its advantages.

What I claim as new is—

1. A hay raking and loading attachment comprising an axle, traction-wheels, rake-teeth secured to said axle, an elevator and gearing between the same and the traction-wheels, means for detachably connecting the attachment with a wagon, and means pivoted on the connection for raising the front end of said attachment to disengage it from the wagon.

2. A hay raking and loading attachment comprising an axle, traction-wheels, rake-teeth secured to said axle, an elevator and gearing between the same and the traction-wheels, means for detachably connecting the attachment with a wagon, means pivoted on the connection for raising the front end of said attachment to disengage it from the wagon, and for holding said front end in its elevated position.

3. A hay raking and loading attachment comprising an axle, traction-wheels, rake-teeth secured to said axle, an elevator and gearing between the same and the traction-wheels, means for detachably connecting the attachment with a wagon, means pivoted on the connection for raising the front end of said attachment to disengage it from the wagon, and for holding said front end in its elevated position.

4. In a hay raking and loading attachment, the combination with the rake, and the elevator, of pivotally-mounted rakers disposed in front of the rake-teeth and upon the outside thereof and inclined inward and forward.

5. In a hay raking and loading attachment, the combination with the rake and the elevator, of means beneath the elevator-frame connecting the attachment with the wagon, and rakers disposed to act in advance of the rake-teeth and pivotally connected with said attaching means.

6. In a hay raking and loading attachment, the combination with the rake and the elevator, of arms secured to the elevator-frame and converging at their forward ends and forming an eye, a cross-bar connecting said arms rearward of said eye, braces secured to the elevator-frame and bracing the said arms to the rear of said cross-bar, and rakers pivotally mounted upon the under side of said cross-bar.

7. In a hay raking and loading attachment, the combination with the rake and the elevator, of arms secured to the elevator-frame and converging at their forward ends and forming an eye, a cross-bar connecting said arms rearward of said eye, rakers pivotally mounted upon the under side of said cross-bar, and supporting-legs pivotally mounted upon the upper side of said cross-bar.

8. In a hay raking and loading attachment, the combination with the rake and the elevator, of arms secured to the elevator-frame and converging at their forward ends and forming an eye, a cross-bar connecting said arms rearward of said eye, rakers pivotally mounted upon the under side of said cross-bar, supporting-legs pivotally mounted upon the upper side of said cross-bar, and a lever and connections for actuating said supporting-legs.

9. In a hay raking and loading attachment, the combination with the rake and the elevator, of arms secured to the elevator-frame and converging at their forward ends and forming an eye, a cross-bar connecting said arms rearward of said eye, rakers pivotally mounted upon the under side of said cross-bar, supporting-legs pivotally mounted upon the upper side of said cross-bar, a lever and connections for actuating said supporting-legs, said lever extending downwardly, and a curved segment depending from the elevator-frame for coöperation with said lever.

10. In a combined raker and loader attachment, the combination of the axle and traction-wheels, the rake-teeth on the axle, the elevator-frame pivotally connected with said axle, a lever pivotally mounted on the elevator-frame, and rods pivotally connected with said lever upon opposite sides of its pivot and arms extending upward and downward from said axle and pivotally connected with said rods.

11. In a combined raker and loader attachment, an axle, traction-wheels, rake-teeth on said axle, an elevator-frame and movable belt, gearing between the traction-wheels and the said belt, pivotally-supported rakers mounted beneath the elevator-frame and disposed to act in front of the rake-teeth and upon the opposite sides thereof, and means extending at an angle beneath the elevator-frame for connecting the attachment to a wagon, and on which said rakers are pivoted.

12. In a combined raker and loader attachment, an axle, traction-wheels, rake-teeth on said axle, an elevator-frame and movable belt, gearing between the traction-wheels and the said belt, pivotally-supported rakers mounted beneath the elevator-frame and disposed to act in front of the rake-teeth and upon the opposite sides thereof, means extending at an angle beneath the elevator-frame for connecting the attachment to a wagon, and pivotally-mounted supporting-legs beneath the forward end of the elevator-frame.

13. In a combined raker and loader attachment, an axle, traction-wheels, rake-teeth on said axle, an elevator-frame and movable belt, gearing between the traction-wheels and the said belt, pivotally-supported rakers mounted beneath the elevator-frame and disposed to act in front of the rake-teeth and upon the opposite sides thereof, means extending at an angle beneath the elevator-frame for connecting the attachment to a wagon, pivotally-mounted supporting-legs beneath the forward end of the elevator-frame, and a lever pivoted on the side of the elevator-frame and pivotally connected with said supporting-legs.

Signed by me at Steamboat Springs, Colorado, this 20th day of August, 1903.

ANDY ROWAN.

Witnesses:
E. L. LUTHRIE,
W. E. MYLER.